United States Patent [19]
Horbelt et al.

[11] Patent Number: 5,880,918
[45] Date of Patent: *Mar. 9, 1999

[54] METHOD AND DEVICE FOR MONITORING THE SERVICEABILITY OF A LOAD

[75] Inventors: Michael Horbelt, Vaihingen; Claus-Dieter Nusser, Schwieberdingen; Hans Seitel, Ostfildern; Thomas Igler, Stuttgart; Paul Janischewski, Schwieberdingen, all of Germany

[73] Assignee: Robert Bosch GmbH, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 587,870

[22] Filed: Jan. 11, 1996

[30] Foreign Application Priority Data

Jan. 10, 1995 [DE] Germany .......................... 195 00 452.3

[51] Int. Cl.$^6$ ....................................................... H02H 3/08
[52] U.S. Cl. .................................................. 361/93; 361/31
[58] Field of Search ................................. 361/20, 23, 29, 361/31, 93, 94, 98, 100; 364/528.27, 528.28

[56] References Cited

U.S. PATENT DOCUMENTS

| 4,909,213 | 3/1990 | Mezger et al. . |
|---|---|---|
| 4,951,188 | 8/1990 | Peter et al. . |

FOREIGN PATENT DOCUMENTS

| 36 25 091 | 1/1988 | Germany . |
|---|---|---|
| 37 43 453 | 7/1988 | Germany . |
| 37 32 718 | 4/1989 | Germany . |
| 37 33 623 | 4/1989 | Germany . |
| 37 34 431 | 4/1989 | Germany . |
| 39 20 696 | 1/1991 | Germany . |
| 39 21 329 | 1/1991 | Germany . |
| 41 03 840 | 8/1992 | Germany . |
| 41 27 047 | 2/1993 | Germany . |

*Primary Examiner*—Sally C. Medley
*Attorney, Agent, or Firm*—Kenyon & Kenyon

[57] ABSTRACT

Method and device for monitoring a load, which can be driven by means of an output stage as a function of the control signals of a control unit, the output stage carrying out fault monitoring and emitting an appropriate fault signal, wherein faults are detected only when at least one further condition is satisfied in addition to the fault signal.

24 Claims, 3 Drawing Sheets

5,880,918

METHOD AND DEVICE FOR MONITORING THE SERVICEABILITY OF A LOAD

FIELD OF THE INVENTION

The present invention relates to a method and a device for monitoring the serviceability operability of a load.

BACKGROUND INFORMATION

Such a method and such a device are disclosed in German Patent No. DE 36 25 091 (corresponding to U.S. Pat. No. 4,951,188). There, an output stage is proposed in a bridge circuit with four switching elements, the current through the load, which is arranged in the diagonal path of the bridge, being detected and compared with predetermined threshold values. If the current through the load exceeds a predetermined maximum value, then a short circuit in the region of the load is assumed, and the output stage is therefore switched off. This procedure results in the output stage being switched off even in the case of brief disturbances. The availability of the device is thus limited.

The output stages are preferably selected, in particular for economic reasons, such that the current through the load during typical functional sequences is less than the selected current limit, but in special cases the limit can be reached. If there is a corresponding reaction in such a special case and the load is disconnected, then two undesirable effects can occur, in particular in the case of idle speed controllers. One of these is that the desired function, for example the idle speed regulation, is no longer carried out. Furthermore, consequential damage can occur, in particular destruction of or damage to the controller.

SUMMARY OF THE INVENTION

In the case of the method and device for monitoring a load according to the present invention, the above-mentioned disadvantages are avoided and, in particular, as simple a reaction as possible to fault signals of the output stage is implemented.

Using the procedure according to the present invention, it is possible to reliably distinguish between actual and apparent short circuits.

BRIEF DESCRIPTION OF THE DRAWINGS

The present invention is explained in the following text with reference to the embodiments which are illustrated in the drawings.

DETAILED DESCRIPTION OF THE INVENTION

Figure 1:
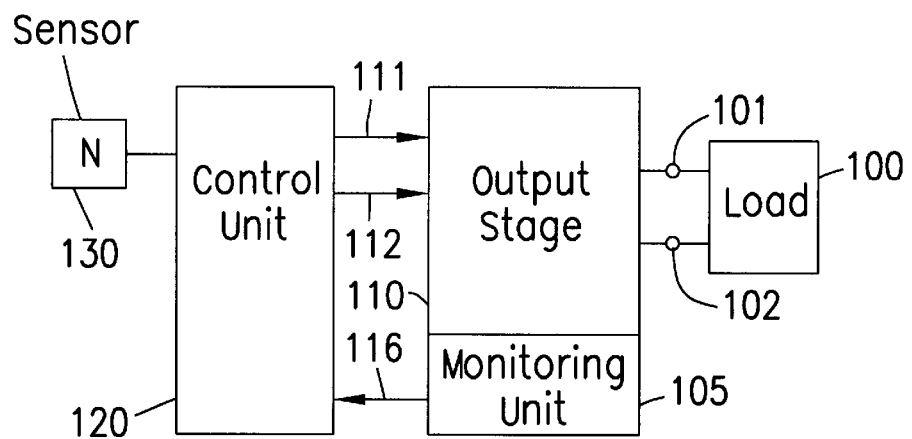
FIG. 1 shows a block diagram of the device according to the present invention.

FIG. 1 shows an exemplary device according to the present invention in rough schematic form as a block diagram.

100 designates a load which is connected via a first connection 101 and a second connection 102 to an output stage 110. Drive signals from a control unit 120 are applied to the output stage 110 via lines 111 and 112. The output stage 110 supplies a signal to the control unit 120, via the line 116. The control unit 120 processes various signals from various sensors 130, in particular a rotation speed sensor.

The load 100 is preferably an electric motor of an idle speed controller, as is described, for example, in German Patent No. DE 37 33 623. However, the procedure according to the present invention is not limited to this application and can also be used for other loads.

The output stage 110 converts the drive signals of the control unit 120, which are transmitted via the fixed lines 111 and 112, into drive signals. The control unit 120 calculates the drive signals on the basis of the output signals from the sensors 130.

The output stage 110 furthermore has a monitoring unit 105 which emits a fault signal via the line 116 when faults occur. In particular, the monitoring device 105 monitors whether there is a short circuit between the load 100 and the ground connection, a short circuit between the supply voltage, or a short circuit between the two connections of the load. This is done by using suitable means to detect the current flowing through the load and evaluating the current to assess whether it exceeds a predetermined threshold value. The current detection can be implemented, for example, by using a so-called current-sense FET as switching means.

Figure 2:
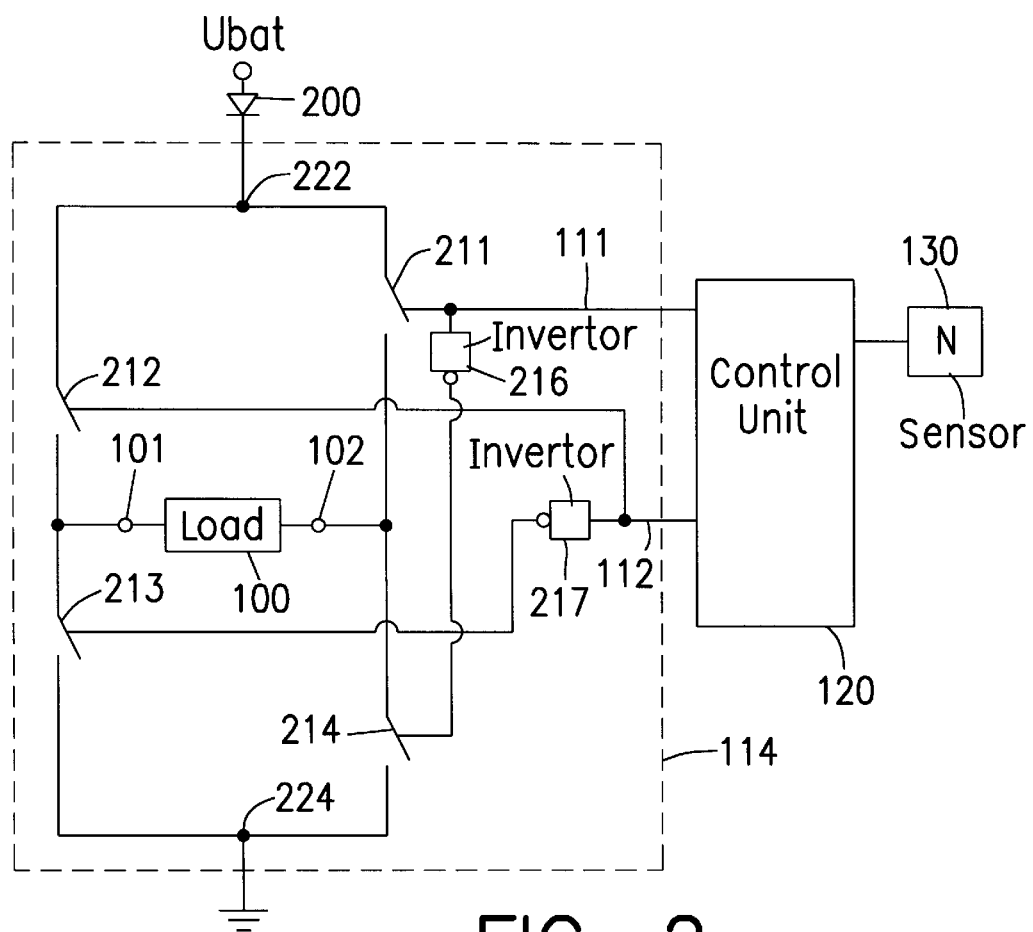
FIG. 2 illustrates essential elements of the output stage according to the present invention.

FIG. 2 shows the output stage 110 in more detail. Elements which have already been described in FIG. 1 are provided with corresponding reference symbols. The output stage 110 includes four switching means 211, 212, 213 and 214. A supply voltage, Ubat, is connected via a polarity-reversal protection diode 200 to a junction point 222. The junction point 222 is connected via a switching means 211 to the output 102. Furthermore, the junction point 222 is in contact with the output 101 via the second switching means 212.

The output 101 is in contact with a junction point 224 via a third switching means 213. The second output 102 is likewise in contact with the junction point 224 via a fourth switching means 214. The point 224 is preferably at ground potential. This arrangement is usually called an H bridge.

Drive signals are applied directly to the switching means 211 via the control line 111, and to the switching means 214 via an invertor 216. Drive signals are directly applied to the switching means 212 via the control line 112, and to the switching means 213 via an invertor 217.

The switching means 211 to 214 are preferably implemented as transistors, in particular as field-effect transistors. Applying a High signal to the line 111 closes the switching means 211 and opens the switching means 214. Applying a Low signal to the line 112 opens the switching means 212 and closes the switching means 213. This drive releases the current flow in a first direction through the load 100.

Applying a High signal to the line 112 changes the switching means 212 to its closed state and the switching means 213 to its open state. Applying a Low signal to the line 111 changes the switching means 214 to its closed state and the switching means 211 to its open state. This type of drive releases the current flow in a second current direction through the load.

Figure 3:
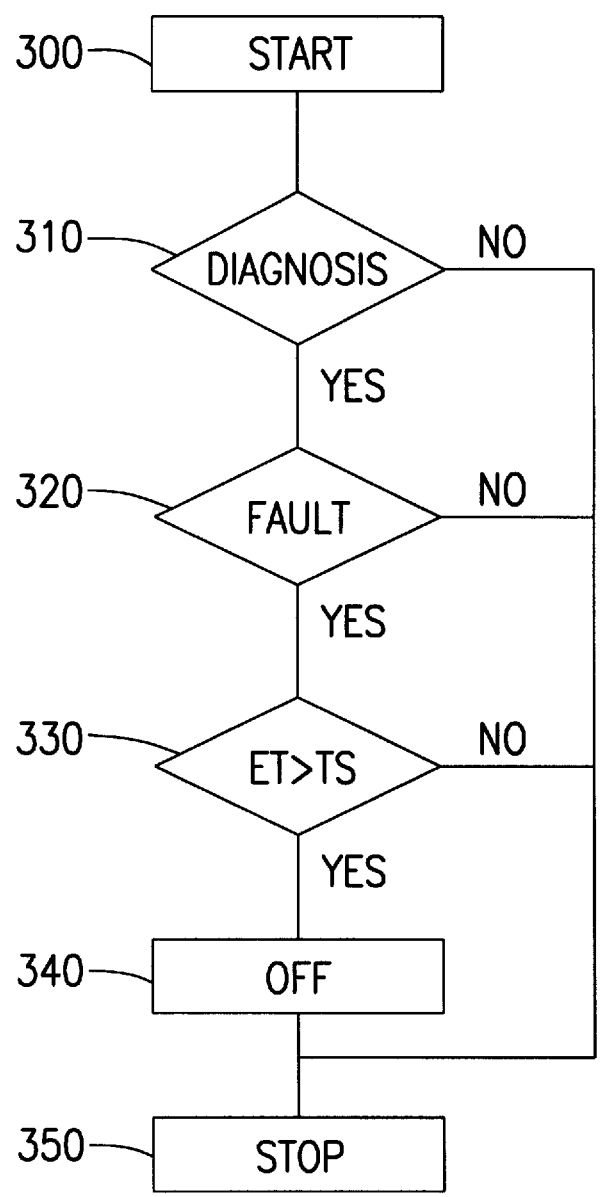
FIG. 3 illustrates a first flow chart according to the present invention.

The procedure for fault monitoring according to the present invention is as illustrated in FIG. 3. A subroutine, which is illustrated schematically in FIG. 3, is started in step 300 at specific time intervals, preferably every 10 ms. A first question 310 checks whether the diagnosis of the output stage 110 is released. This question checks whether defined operating states are present in which no diagnosis is carried out. These are operating states in which the current assumes greater values than in normal operation. If this is not the case, then the program continues with step 350, in which the subroutine ends and the program returns to the main program for controlling the internal combustion engine.

This procedure avoids faults being detected in specific operating states in which a greater current may flow than in normal operation. Such an operating state occurs, for example, when the control unit is producing drive signals such that the idle speed controller assumes a preferred position, such as its limit stops, for example. Furthermore, increased current values are also possible in extreme environmental conditions, such as at low temperatures, for example.

The effect described above could also be implemented by a higher threshold value for the current monitoring. However, it is not possible to detect all faults reliably in normal operation using a higher threshold value. Faults can be reliably detected by the procedure according to the present invention in which the threshold value for the current is selected such that current values which do not occur in normal operation produce a fault message, and faults are not detected when not in normal operation and specific operating states are present in which higher current values are possible, even when the fault signal is present.

If the diagnosis is released, then the question 320 follows, which checks whether a fault signal has been transmitted from the output stage via the line 116. If this is not the case, then step 350 likewise follows. The question 320 is preferably implemented such that a question is asked every 1.25 ms as to whether a fault signal which indicates a fault is present through the line 116. If this is the case, a fault hit is set. The question 320 is then asked at an increased time interval. The output stage is not switched off until a fault has been detected a number of times.

If this is the case, then the question 330 follows, which checks whether a so-called bounce-settling time ET has elapsed. If this is not the case, then step 350 likewise follows. If this is the case, this means that the signal 116 has been present on the line 116 for longer than a predetermined time threshold TS, and step 340 thus follows. The output stage 110 is switched off in step 340. This means that all the output signals are at the Low level.

By means of this procedure, special cases in which a short circuit has been identified by the output stage 110 without a real short circuit being present can be distinguished from those states in which there is no short circuit although the current has briefly exceeded the threshold value. By means of this procedure, it is possible to detect those special cases in which the output stage indicates a fault because of the increased current flowing in specific operating states.

In these cases, the damaging effect of the fault signal emitted by the output stage is avoided via a time domain filter stage. A short circuit is not detected until the previously defined waiting time has elapsed. Thus, all relevant fault states of the controller can be reliably diagnosed by means of suitable time monitoring of the fault signal, and a reasonable reaction can be initiated.

If the threshold value for the permissible current is briefly exceeded, this normally corresponding to a short circuit, there is no fault reaction. Faults are not detected, and appropriate measures initiated, until the fault signal has occurred for a relatively long time, which indicates an actual short circuit. If a fault is detected, the output stage is switched off, for example.

Figure 4:
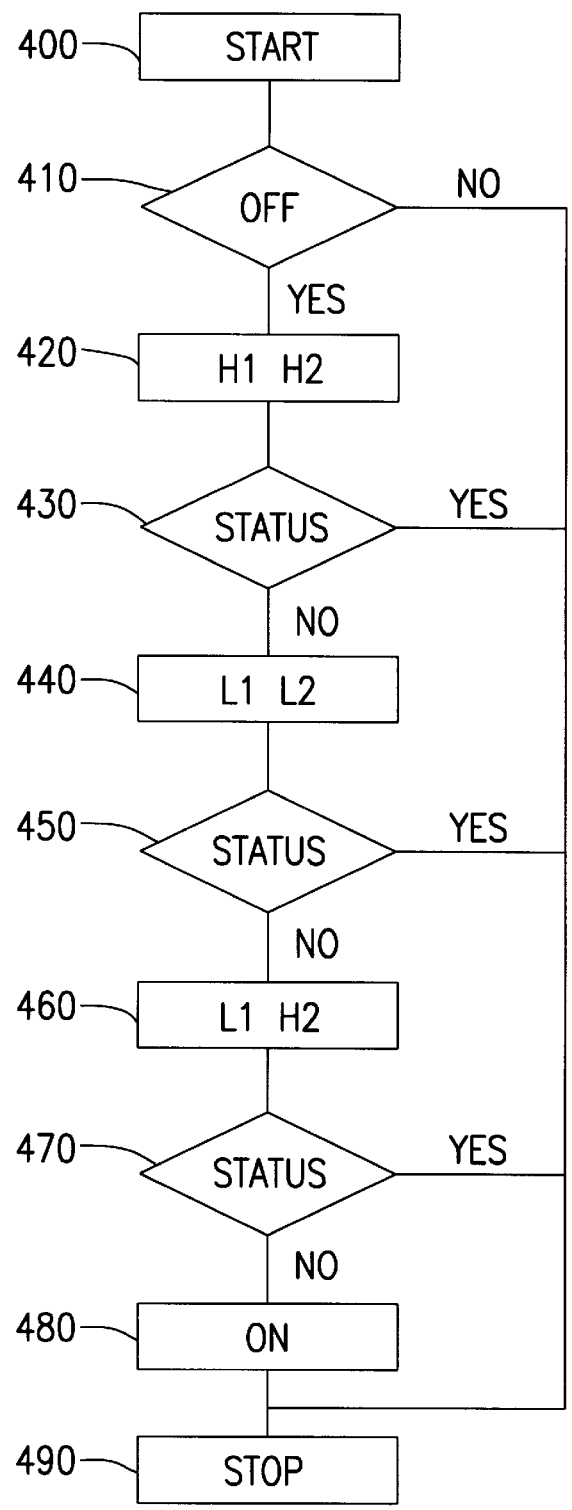
FIG. 4 illustrates a second flow chart explaining the procedure according to the present invention.

In order to allow continued operation of the internal combustion engine after a fault has been detected, the output stage 110 is successively switched into three different states at relatively long time intervals in order to check whether the short circuit is still present. If the short circuit is no longer found, the output stage is released for the normal drive. This is done in accordance with a subroutine illustrated in FIG. 4.

This subroutine is started at step 400 in a specific time frame. The question 410 checks whether the output stage is switched off. If this is not the case, then step 490 follows, in which the subroutine ends and the program jumps back to the main program.

If the question 410 detects that the output stage 110 is switched off, a High signal H1 is applied to the line 111 and a High signal H2 to the line 112, in step 420. The subsequent question 430 checks whether a fault message is present on the line 116. A fault message would occur if the load has a short circuit to ground. If a fault is present, then step 490 follows again.

If there is no fault, then a Low signal L1 is applied to the line 111, and a Low signal L2 to the line L2 (lacuna), in step 440. The subsequent question 450 checks whether there is a fault signal on the line 116. If this is the case, then step 490 likewise follows. If the question 450 detects that a fault signal is present, then this is an indication that a short circuit has occurred between the load and the supply voltage $U_{bat}$.

Subsequently, in step 460, a Low signal L1 is emitted via the drive line 111 and a High signal H2 via the line 112. It is also possible for a High signal to be emitted via the line 111 and a Low signal via the line 112. The subsequent question 470 checks whether there is a fault signal on the line 116. This question allows further fault states, in particular a turns short, to be detected. If this is the case, then step 490 follows. If this is not the case, that is to say none of the questions 430, 450 and 470 detected a signal occurred on the line 116, then the output stage 110 is switched on again in step 480.

What is claimed is:

1. A method for monitoring an operability of a load, the load having a first operating state and a second operating state, comprising the steps of:

of detecting a current flow through the load, wherein in the first operating state of the load, the current flow through the load has a first value, and wherein in the second operating state of the load, the current flow through the load has a second value, the second value being greater than the first value;

determining as a function of a current operating state of the load whether a diagnosis of the load is possible, wherein the diagnosis is possible if the current operating state of the load corresponds to the first operating state, and wherein the diagnosis is not possible if the current operating state of the load corresponds to the second operating state;

providing a fault signal when the detected current flow through the load is greater than a preselected threshold value; and indicating a load error condition only when the fault signal is provided and the load is in the first operating state and not in the second operating state.

2. The method according to claim 1, wherein the fault signal is provided when a short circuit condition exists.

3. The method according to claim 1, wherein an output stage is coupled to the load, and further comprising the step of setting an output signal of the output stage to a predetermined value when the load error condition is indicated.

4. The method according to claim 3, further comprising the steps of:

detecting whether the output signal of the output stage corresponds to the predetermined value;

if the output signal of the output stage corresponds to the predetermined value, applying at least one signal to the output stage to determine whether a predetermined condition is present in one of the output stage and the load; and if the predetermined condition is not present in the output stage and in the load, setting the output signal of the output stage to a second predetermined value.

5. The method according to claim 4, wherein the predetermined condition corresponds to a short circuit condition.

6. The method according to claim 4, wherein a first side of the output stage is coupled to a first voltage potential, wherein a second side of the output stage is coupled to a second voltage potential, and wherein the step of applying the at least one signal to the output stage includes the steps of:

applying a first set of signals to an input of the output stage to determine whether the predetermined condition is present between the output stage and the first voltage potential, applying a second set of signals to the input of the output stage to determine whether the predetermined condition is present between the output stage and the second voltage potential, applying a third set of signals to the input of the output stage to determine whether the predetermined condition is present in the load, and setting the output signal of the output stage to the second predetermined value if the predetermined condition is not present between the output stage and the first voltage potential, between the output stage and the second voltage potential, and in the load.

7. The method according to claim 1, wherein the fault signal is provided when the detected current flow through the load is greater than the preselected threshold value for a predetermined period of time.

8. The method according to claim 1, wherein the preselected threshold value is greater than a current value of the first operating state of the load.

9. The method according to claim 1, wherein the load error condition is indicated only when the fault signal is provided in each of a predetermined number of time intervals.

10. The method according to claim 1, wherein an output stage is coupled to the load, the output stage including a switching circuit, and further comprising the steps of:

applying at least one drive signal to the switching circuit;

detecting the current flow through the load as a function of the at least one drive signal; and producing the fault signal when the load is in the first state, the operability being determined as a function of the current flow through the load provided by the at least one drive signal.

11. The method according to claim 1, wherein the load includes an idle speed controller.

12. The method according to claim 1, further comprising the step of:

influencing the current flow through the load via a switching circuit.

13. The method according to claim 1, further comprising the step of:

switching off the load when the load error condition is indicated.

14. The method according to claim 1, wherein the second value is greater than the preselected threshold value.

15. The method according to claim 1, wherein the second operating state is outside a switch-on state of the load.

16. The method according to claim 1, wherein the load is in the second operating state when the load has a low temperature.

17. The method according to claim 1, wherein the load is in the second operating state when the load assumes a limit stop position.

18. The method according to claim 17, wherein the load includes an idle speed controller.

19. A device for monitoring an operability of a load, comprising:

an output stage influencing a current flow through the load and detecting the current flow through the load;

a monitoring unit coupled to the output stage, the monitoring unit providing a fault signal when the detected current flow through the load is greater than a preselected threshold value; and a control unit coupled to the output stage and the monitoring unit, the control unit determining as a function of a current operating state of the load whether a diagnosis of the load is possible wherein the diagnosis is possible if the current operating state of the load corresponds to a first operating state, and wherein the diagnosis is not possible if the current operating state of the load corresponds to a second operating state, wherein the control unit indicates a load error condition only when the fault signal is provided and the load is in the first operating state and not in the second operating state, wherein in the first operating state of the load, the current flow through the load has a first value, and wherein in the second operating state of the load, the current flow through the load has a second value, the second value being greater than the first value.

20. The device according to claim 19, wherein the load includes an idle speed controller.

21. The device according to claim 19, wherein the second operating state is outside a switch-on state of the load.

22. The device according to claim 19, wherein the load is in the second operating state when the load has a low temperature.

23. The device according to claim 19, wherein the load is in the second operating state when the load assumes a limit stop position.

24. The device according to claim 23, wherein the load includes an idle speed controller.

* * * * *